Patented Feb. 6, 1945

2,369,061

UNITED STATES PATENT OFFICE 2,369,061

PREPARATION OF NITRILES

Donald John Loder and Walter Martin Bruner, Wilmington, Del., assignors to E. I. du Pont de Nemours & Company, Wilmington, Del., a corporation of Delaware No Drawing. Application October 22, 1942, Serial No. 463,000

2 Claims. (Cl. 260—464)

This invention relates to the preparation of aliphatic dinitriles and more particularly to their preparation from the half esters of dibasic acids and their substitution products.

The prior art shows that certain aliphatic dinitriles can be prepared by dehydrating aliphatic diamides with phosphorus halides. Fischl and Steiner in U. S. Patent 1,876,652 describe the preparation of sebaconitrile by dehydration of ammonium sebacate with phosphorus oxychloride, the reaction being conducted in the presence of pyridine. Sebaconitrile was also obtained by Phookam and Krafft, Ber. 25, 2252 (1892) by treating sebacodiamide with phosphorus pentachloride. Such processes are, however, not by and large attractive commercially because of the difficulty in regeneration of the dehydration catalysts employed and attendant high cost of the product. In recent years vapor phase processes have been employed wherein fatty acid amides have been passed in the presence of ammonia over dehydration catalysts; the yields of such processes have not been, however, as satisfactory as could be desired.

An object of the present invention is to provide an improved process for the preparation of aliphatic dinitriles having at least three carbon atoms. A further object is to provide a convenient and economical process by which aliphatic dinitriles may be prepared from ammonia and the esters and more especially the half esters of aliphatic dicarboxylic acids having at least three carbon atoms. A still further object is to provide a catalytic dehydration process for the preparation of aliphatic dinitriles having at least three carbon atoms from the half esters of corresponding aliphatic dicarboxylic acids and their substitution products. Yet another object is to provide operating conditions and catalysts for conducting these reactions. Other objects and advantages of the invention will hereinafter appear.

These and other objects are accomplished in accord with the invention in which an ester and preferably a half ester of an aliphatic dicarboxylic acid or a salt, amide or nitrile thereof containing at least three carbon atoms is heated in the liquid state and in a rapid stream of ammonia at nitrile-forming temperatures and in the presence or absence of a nitrile-forming catalyst. The dinitrile formed as a result of this reaction is swept out of the reactor by the stream of ammonia and by the steam generated during reaction into a condenser from which it can be recovered and purified by fractional distillation. The reaction is illustrated by the equation:

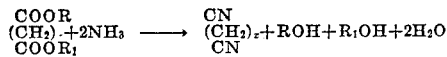

in which R is an alkyl group such as methyl, ethyl, n- and iso-propyl or a higher alkyl group, R₁ is similar to R or may be a hydrogen group, and $x$ is a positive integer.

The invention is more specifically illustrated by the equation:

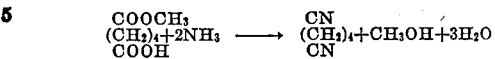

wherein adiponitrile is the product of the reaction of monomethyl adipate and ammonia.

The reaction is believed to be not as simple as is indicated by the above equations which show the overall reaction. Some of the intermediate steps are believed to be:

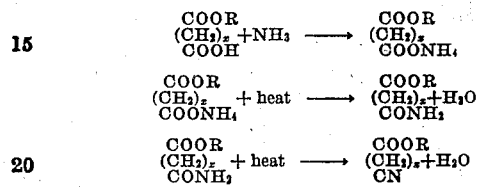

The ester group is also believed to proceed through the same series of reactions from salt, to amide to nitrile. The reaction may, therefore, be carried out by starting with either the half ester of the acid, salt, amide or nitrile.

An important feature of the invention by means of which exceptional yields of the dinitriles are obtained resides in the manner of introducing the ammonia into the ester The reaction is conducted in the liquid phase and the liquid is maintained under efficient agitation thereby effecting the best possible distribution of the ammonia vapor throughout the mixture. Moreover, in order to further this result the ammonia vapor is preferably introduced as a fine, high velocity stream into the agitated liquid.

Alternative means for carrying out the reaction also in the liquid phase are: simultaneously introducing ammonia and the ester into a tubular reactor maintained at operating conditions. The catalyst may be contained in the tube or may be dissolved or otherwise mixed with the ester. Reaction may be continuous or batchwise.

The esters as well as the half esters of the aliphatic dibasic acids containing at least three carbon atoms may be employed but as has been stated the half esters are preferred. The reason for this is that while diesters of these acids will react, under the conditions hereinafter more fully particularized, to form the dinitriles the reaction does not go with the facility with which the half esters of the acids are converted to the dinitrile. Diesters tend to be removed by distillation from the reaction mixture before they are converted to their amides and then dehydrated to nitriles. This is because ester groups react with NH₃ much slower than acid groups. This difficulty is avoided with half esters, because the salt-ester which is immediately formed is relatively non-volatile, and hence remains in the reaction long enough for the ester group to be converted to amide and then nitrile groups. Of course some molecules of partially converted material such as methyl cyanovalerate (ester nitrile) are distilled before the ester groups can be converted to nitrile groups. These, if desired, can be recycled.

Examples will now be given illustrating preferred embodiments of the invention in which parts are by weight unless otherwise indicated.

Example 1

Into a reaction provided with a retort head 2.25 moles of monomethyl adipate and 10 parts of phosphoric acid were charged. Into this mixture at a temperature of 260–270° a stream of gaseous ammonia was injected with efficient distribution at the rate of about 6 parts per minute. During a reaction period of about ½ hour the stream of excess ammonia carried through the retort head into a condensing system vapors which on condensation gave 194 parts by weight of excess ammonia in addition to 422.5 parts of a less volatile condensate. There remained in the reactor 22 parts of residue containing the catalyst or its ammonia derivatives. On fractionally distilling the condensate the following materials were obtained: fraction #1, water-methanol mixture, 125 parts; fraction #2, methyl cyanovalerate, B. P. 93°/3 mm., 68 parts; fraction #3, adiponitrile, B. P. 124°/3 mm., 93.7 parts; residual liquid, partially converted materials, 124 parts. The residue for efficient operation is recycled.

Example 2

Into a reactor similar to that described in Example 1, a charge consisting of 2 moles of monomethyl adipate and 10 parts of boron phosphate was introduced. During a 3.5 hour period of reaction a stream of gaseous ammonia was injected into the rapidly agitated reaction mixture at 275°, a further charge of 2 moles of monomethyl adipate being added dropwise during the reaction so that operation was continuous. The excess of ammonia used was 256 parts; the condensate was 761.2 parts and the residue in the reaction was 17 parts, including the catalyst. Fractional distillation of the condensate gave the following materials: fraction #1, water and methanol, 141 parts; fraction #2, methyl cyanovalerate, 154 parts; fraction #3, adiponitrile, 185.6 parts; residual liquid, partially converted material, 173.3 parts.

Example 3

Into a reactor similar to that described in Example 1 a charge was introduced consisting of 2.25 moles (360 parts by weight) of monomethyl adipate, and 10 parts by weight of phosphoric acid. During a 1-hour period of reaction, a stream of gaseous ammonia was injected at a rate of about 4 parts by weight per minute into the rapidly agitated reaction mixture at 270–275°. The excess of ammonia condensed was 119 parts; the condensate was 431.5 parts; and the residue in the reactor was 14.3 parts, including the catalyst or its reaction products. Fractional distillation of the condensate gave the following materials: fraction #1, principally water and methanol, 148.5 parts; fraction #2, methyl cyanovalerate, 62.3 parts; fraction #3, adiponitrile, 134.0 parts; residual liquid, partially converted material, 79.9 parts.

Example 4

In order to determine the value of the residue obtained as described in the above examples, 250 parts of combined residues were charged together with 10 parts of phosphoric acid into the reactor described in Example 1. Into this residue at a temperature between 260 and 270° C., a strong stream of gaseous ammonia was injected with efficient distribution. During a reaction period of 1 hour there remained in the reactor 17.6 parts of residue, 204 parts of liquid ammonia (as anhydrous) distilled over, together with an additional condensate of 264 parts. Upon redistillation the latter gave 35 parts of methyl cyanovalerate, 142 parts of adiponitrile and 34 parts of residue, which may again be recycled with the 17.6 parts aforesaid.

The processes above described are useful for the preparation of the nitriles from aliphatic dibasic monoesters in which the carboxyl groups are separated by at least three carbon atoms. Preferably the lower esters of such acids should be employed, such, for example, as the methyl, ethyl, normal and isopropyl, normal and isobutyl esters and more especially the half esters of the $C_nH_{2n-2}O_4$ acids such, for example, as malonic acid, succinic acid, adipic acid, sebacic acid, dodecamethylene dicarboxylic acid and the like.

The process may be carried out in the presence or absence of a catalyst. In the latter case the conversion per cycle is comparatively low but unreacted raw materials and intermediate products may, if desired, be recycled. It is preferred, however, to use a catalyst for the rate of dehydration and the yields per pass are considerably increased by its use. Nitrile-forming catalysts generally may be employed which are adapted to the dehydration of amides and these catalysts include, for example, the phosphate catalysts such as boron phosphate, phosphoric acid, and its acid salts and pyrolytic derivatives, ammonium phosphate, ammonium molybdate, ammonium tungstate, ammonium vanadate, ammonium phosphomolybdate, ammonium sulfate, copper chromite and ammonium or metal salts of other suitable oxygenated acids. Many of the catalysts used in the vapor phase processes such as are described in Lazier U. S. Patent 2,144,340 may also be used. These and similar catalysts may be used in amounts ranging from 0.2 to 10% of the weight of the ester used.

The reaction is carried out at temperatures between 150 and 350° C. and preferably between temperatures of 270 and 300°, the exact temperature shown will vary considerably with the particular catalyst and the particular ester treated. The reaction may be carried out under vacuum, atmospheric, or superatmospheric pressure. Under the lower pressures the reaction will proceed at a lower rate; however, when conducting the reaction for the preparation of a dinitrile subject to decomposition under high temperatures it is preferable to carry out the reaction under lower pressure conditions.

The ammonia, preferably as the anhydrous vapor, is introduced into the liquid ester in excess of the amount necessary to form the dinitrile and in sufficient excess to sweep over the dinitrile as and when formed. Diluents may be present with the ammonia such, for example, as the inert gases, nitrogen and carbon dioxide, or vapors of benzene, or toluene. The use of excess ammonia is of first order importance for by removing the dinitrile as formed by what may be called ammonia-distillation, which distillation has many attributes and advantages similar to steam-distillation, an exceptionally high utilization of the raw materials is made possible. When the half ester of the dicarboxylic acids, or their aforementioned substitution products, are so treated the loss of the ester to non-reconvertible by-products is exceptionally low. More or less water vapor in the ammonia stream while generally not desirable, is, if present in moderate amounts, not objectionable.

The products condensed from the ammonia stream may be treated in any suitable manner for the purification of the dinitriles contained therein. Generally, however, it has been found desirable to recover and purify by fractional redistillation at reduced pressure. Lower and higher boiling materials resulting from this separation may, if desired, be recycled. With nitriles which are partially or completely water-soluble, it has been found expedient to extract the filtered distillate with a solvent such as benzene in which the nitrile is extremely soluble. Separation of nitriles from benzene extract is easily effected by subsequent distillation. Other methods of separating the dinitriles may be employed if desired.

We claim:

1. In a process for the preparation of adiponitrile from a half alkyl ester of adipic acid, the steps which comprise passing a steam of anhydrous ammonia through a liquid half alkyl ester of adipic acid maintained at a temperature between 150 and 350° C. in the presence of a nitrile forming catalyst, the anhydrous ammonia being introduced in sufficient amounts and the reaction being conducted under such temperatures that the adiponitrile is carried from the zone of the reaction substantially as rapidly as formed whereby the formation of decomposition products of adiponitrile is inhibited.

2. In a process for the preparation of adiponitrile from monomethyl adipate, the steps which comprise passing a stream of ammonia through the liquid monomethyl adipate maintained at a temperature between 220 and 300° C. in the presence of phosphoric acid as the catalyst, the ammonia being introduced in sufficient amounts to carry the adiponitrile from the zone of the reaction substantially as rapidly as formed whereby formation of decomposition products of adiponitrile is inhibited.

DONALD JOHN LODER.
WALTER MARTIN BRUNER.